US012674734B2

(12) United States Patent (10) Patent No.: US 12,674,734 B2

Shih et al. (45) Date of Patent: Jul. 7, 2026

(54) VISCOMETER AND OPERATION METHOD THEREOF

(71) Applicant: FENG CHIA UNIVERSITY, Taichung City (TW)

(72) Inventors: Chih-Hsin Shih, Taichung City (TW); Shen-Fu Weng, Taichung City (TW)

(73) Assignee: FENG CHIA UNIVERSITY, Taichung City (TW)

( * ) Notice: Subject to any disclaimer, the term of this patent is extended or adjusted under 35 U.S.C. 154(b) by 992 days.

(21) Appl. No.: 17/865,373

(22) Filed: Jul. 14, 2022

(65) Prior Publication Data

US 2023/0014849 A1     Jan. 19, 2023

(30) Foreign Application Priority Data

Jul. 15, 2021     (TW) ................................. 110126155

(51) Int. Cl.
*G01N 11/16*          (2006.01)
*B01L 3/00*          (2006.01)

(52) U.S. Cl.
CPC .......... *G01N 11/16* (2013.01); *B01L 3/50273* (2013.01); *B01L 2200/027* (2013.01); *B01L 2200/10* (2013.01); *B01L 2200/16* (2013.01); *B01L 2300/0663* (2013.01); *B01L 2300/0803* (2013.01); *B01L 2400/0409* (2013.01); *B01L 2400/0487* (2013.01)

(58) Field of Classification Search
CPC ............. G01N 11/16; G01N 2011/008; G01N 11/162; B01L 3/50273; B01L 2200/027; B01L 2200/10; B01L 2200/16; B01L 2300/0663; B01L 2300/0803; B01L 2400/0409; B01L 2400/0487
See application file for complete search history.

(56) References Cited

U.S. PATENT DOCUMENTS 7,861,576 B2     1/2011 Joung
2008/0276729 A1*  11/2008 Joung ............. G01N 35/00069
73/863.03

FOREIGN PATENT DOCUMENTS

TW          200528702 A     9/2005
TW          200912277 A     3/2009
TW          201945707 A     12/2019

* cited by examiner

*Primary Examiner* — Brian J. Sines
(74) *Attorney, Agent, or Firm* — Cheng-Ju Chiang

(57) ABSTRACT

The invention provides a viscometer and an operation method thereof. The viscometer comprises a disk and at least one microfluidic structure. The microfluidic structure is embedded in the disk and has a first chamber which is connected to a second chamber. The second chamber is provided with an annular chamber along the circumferential direction of the disk and comprises at least one indicator. Overall, the present viscometer and its operation method do utilize the oscillation amplitude of pendulum motion of the indicator to calculate a viscosity value (cP) of a sample which has already existed in the second chamber.

10 Claims, 7 Drawing Sheets

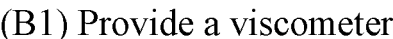

(B1) Provide a viscometer

↓

(B2) Inject the sample into the first chamber

↓

(B3) Apply a centrifugal force to the first chamber of the at least one microfluidic structure by the driver, when the centrifugal force reaches the specific tension threshold, the sample in the first chamber will break through the first microchannel and then flowing into the second chamber

↓

(B4) After mixing the sample with the reactant to form a mixed sample in the reacting chamber, a force is applied to the reacting chamber for leading the mixed sample to break through the third microchannel and then flow into the second chamber

↓

(B5) Apply a force to the second chamber by the driver again to oscillate the sample and the indicator stored in the second chamber

↓

(B6) a monitoring device determines an oscillation amplitude of pendulum motion of the at least one indicator and calculates a viscosity value of the sample according to the oscillation amplitude of pendulum motion

FIG. 7

VISCOMETER AND OPERATION METHOD THEREOF

FIELD OF THE INVENTION

The present invention relates to a viscometer and operation method thereof, and more particularly to a viscometer and operation method thereof used for low-volume samples.

BACKGROUND

The conventional techniques of viscosity measurement may be applied in several technical fields such as polymeric materials, food, or bioassay such as the blood test. For instance, the principle of conventional viscosity measurement method comprises the rolling-ball method, falling-ball method or vibrating method. Specifically, the rolling-ball and falling-ball methods are characterized in that the viscosity of the sample is determined by detecting the average speed of a spherical indicator which is stored in the tilted test tube.

However, the sample volume requirement of the conventional rolling-ball and falling-ball method is relatively large (i.e. up to 10 ml). On the other hand, the measurement device of the conventional methods is typically designed to be disposable. Therefore, the sample with insufficient volume or the sample is rare or expensive, those reasons may impede and restrict the conventional viscosity measurement. Furthermore, the conventional viscometer is usually inconvenient for carrying and expensive, which undoubtedly increases the burden of the viscosity measurement.

SUMMARY

In order to solve at least one problem mentioned above, the present invention relates to a viscometer and operation method thereof. The present invention indicates a viscometer and operation method used for low-volume samples. The viscometer has the advantages associated with immediate calculation and/or continuous calculations on a viscosity value (cP) of the low-volume samples. Specifically, the present invention determines a viscosity value of a sample stored in a second chamber with the variation of oscillation amplitude of pendulum motion of an indicator in the second chamber. Thereby, the present invention may only need to inject a low-volume sample to measure the viscosity value thereof. Moreover, the calculation efficiency of the present invention may be improved by cooperating with an automated procession of a monitoring device.

In accordance with some embodiments of the present invention, a viscometer is provided and comprises a disk and at least one microfluidic structure. The microfluidic structure is embedded in the disk and a first chamber of the microfluidic structure is connected to a second chamber. Furthermore, at least one part of the second chamber is curved and comprises at least one indicator.

In accordance with some embodiments of the present invention, an operating method of a viscometer is provided. The operating method comprises the following steps: inject the sample into the first chamber. Apply a centrifugal force to the first chamber of the at least one microfluidic structure by the driver when the centrifugal force reaches the specific tension threshold, and the sample in the first chamber will break through the first microchannel and then flow into the second chamber. Apply a force to the second chamber by the driver again to oscillate the sample and the indicator stored in the second chamber. Thereafter, a monitoring device is used to determine the oscillation amplitude of pendulum motion of at least one indicator and calculates a viscosity value (cP) of the sample according to the oscillation amplitude of pendulum motion.

The above summary of the present invention is to provide a basic description of the various aspects and features of the present invention. It is not a detailed description. Its purpose is not to specifically recite keys or critical elements of the present invention, and it is not intended to limit the scope of the present invention. It merely presents a few concepts of the present invention in a concise manner.

BRIEF DESCRIPTION OF THE DRAWINGS

FIG. 7 is another flowchart illustrating an operating method of a viscometer in accordance with an embodiment of the present invention.

DETAILED DESCRIPTION OF THE INVENTION

To clarify the purpose, technical solutions, and the advantages of the disclosure, embodiments of the present invention will now be described more fully hereinafter with reference to the accompanying drawings.

At least one embodiment of the present invention relates to a viscometer and operation method thereof. Particularly, the viscometer and operation method thereof are used for low-volume samples.

Figure 1:
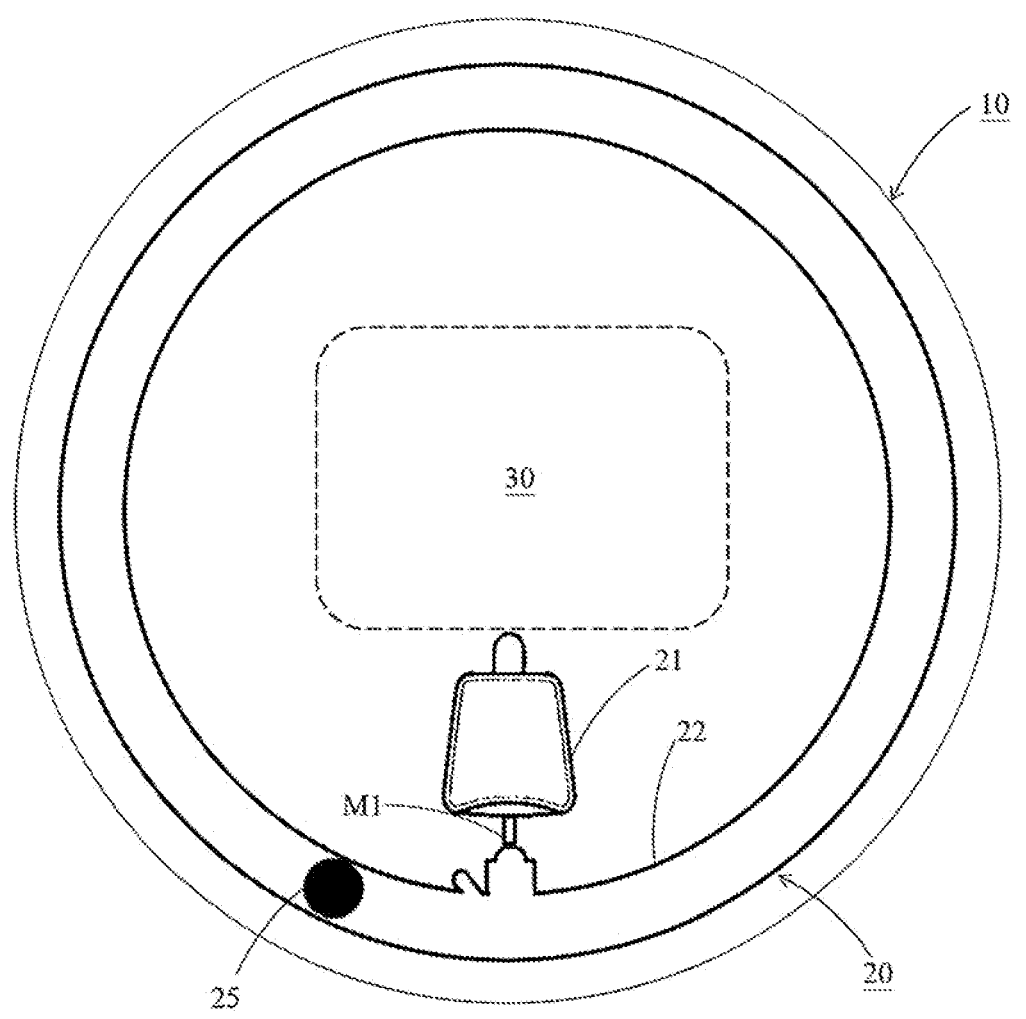
FIG. 1 is a schematic diagram depicting a viscometer in accordance with an embodiment of the present invention.

Please see FIG. 1. FIG. 1 is a schematic diagram depicting a viscometer in accordance with one embodiment of the present invention. The viscometer 1 comprises at least one microfluidic structure 20 which is embedded in a disk 10. In this embodiment, the disk 10 plays a role as driving and controlling the movements of the microfluidic structure 20.

As shown in FIG. 1, the microfluidic structure 20 comprises a first chamber 21 and a second chamber 22, and a first microchannel M1 is disposed between the first chamber 21 and the second chamber 22, preventing a sample from breaking through an injection hole of the first chamber 21 to flow into the second chamber 22. In an embodiment of FIG. 1, the second chamber 22 is an annular chamber along the circumferential direction of the disk 10 and comprises at least one indicator 25. However, the second chamber 22 can be designed as that the at least one part of the second chamber 22 is curved. The spherical indicator 25 in the present embodiment can naturally slide to the lowest horizontal point of the second chamber 22 via gravity or incline because the ideal planar in the practical space is absent.

In this embodiment, the first chamber 21 is provided as a chamber used to receive the sample and can be driven by a driver 30 such as a centrifugal force, so that the sample is able to flow into the second chamber 22 from the first chamber 21. Therefore, the configured monitoring device 40 is capable of calculating a viscosity value (cP) of a sample that has already existed in the second chamber 22 based on obtaining the oscillation amplitude of pendulum motion of the spherical indicator 25. As used hereinafter, the term "sample" may be any fluid having micro-volume (e.g., the blood having a volume less than or equal to 100 μL).

In this embodiment, the cross-sectional shape of the second chamber 22 is polygonal, round or combinations thereof. When the bottom surface of the at least one part of the second chamber 22 is curved shape that the spherical indicator 25 which is placed within the second chamber 22 will naturally remain in the lowest horizontal point. Please notice that the indicator 25 in the present embodiment may be made of/from any appropriate materials such as magnetic material (Fe, Co, Ni etc.) or non-magnetic material (glass, quartz, plastic material etc.).

Furthermore, the disk 10 in present embodiment may also be made of/from any appropriate materials such as polymethylmethacrylate (PMMA), polymethacrylate (PMA), polyethylene terephthalate (PET), Polycarbonate (PC), Polyvinylchloride (PVC), Polydimethylsiloxane (PDMS), silicone, rubber, glass or combinations thereof. In addition, the disk 10 may further have a shape which is able to match/engage with the driver 30, thereby forming a separable connection between the disk 10 and the driver 30 and being smoothly driven (e.g., the disk 10 can be a plate having the symmetrical shapes such as circle plate, rectangle plate, polygonal plate etc.).

As described above, the configuration of first microchannel M1 which is disposed within the microfluidic structure 20 results in that the sample flowing into the first chamber 21 via injection hole will be effectively remained in the first chamber 21 and prepared well. The centrifugal force which is applied on the microfluidic structure 20 by using said driver 30. When the centrifugal force reaches a tension threshold of the first microchannel M1, otherwise, when said centrifugal force is greater than or equal to said tension threshold, the sample remained in the first chamber 21 breaks through the first microchannel M1, then flow into said second chamber 22 and be at least partly in contact with the indicator 25 therein.

Furthermore, please notice that the first chamber 21 and/or the second chamber 22 may include at least one ventilation pore or similar structures with equal functions for performing ventilation operations of the above microfluidic structure 20 (e.g., an operation for assisting, in circulating the gas in the above microfluidic structure 20).

In some embodiments, the first chamber 21 and/or the second chamber 22 may also include markings for recognizing the positions of the sample and/or the indicator 25. For instance, the markings may be scales or marks that are used for image identification and positioning. Therefore, users may directly observe or observe via a monitoring device 40 to check the current movement of the indicator 25 which is moved by the driver 30. On the other hand, the markings may also be volume scales that may be helpful for users directly observing or observing via the monitoring device 40 to confirm the amount of the injected sample.

In some embodiments, the driver 30 may be designed to have a function that inclines the disk 10 in at least one direction. Furthermore, the tilted disk 10 may be performed by the mechanical arm, the ball-type joint or combination thereof in the rotational status or the oscillatory status. Specifically, the rotating axis of the disk 10 installed on the driver 30 may dynamically adjust the lowest horizontal point (i.e. an oscillatory center point in the testing process) of the indicator 25 in the second chamber 22 mentioned above.

Figure 2:
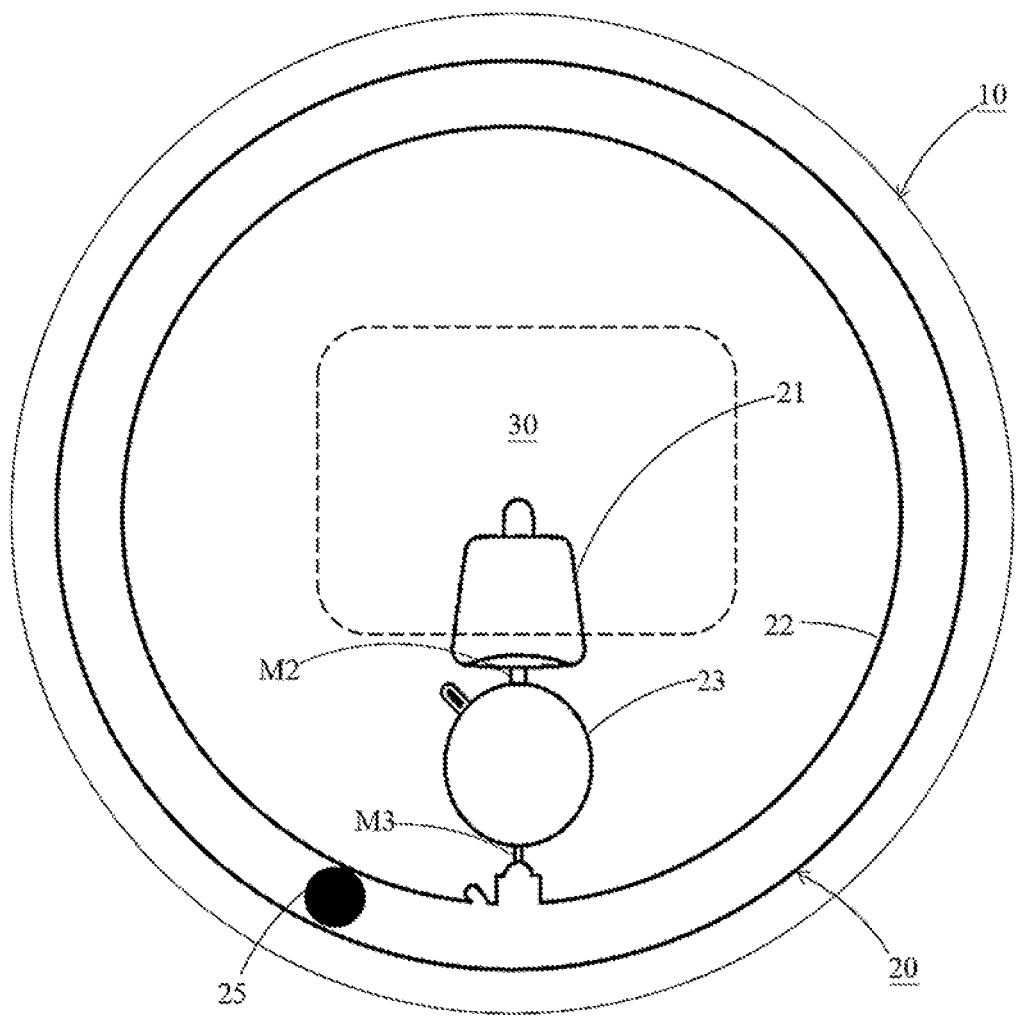
FIG. 2 is another schematic diagram depicting a viscometer in accordance with an embodiment of the present invention.

Please refer to FIG. 1 and FIG. 2. FIG. 2 is another schematic diagram depicting a viscometer in accordance with one embodiment of the present invention. A difference between FIG. 1 and FIG. 2 is that the viscometer 1 in FIG. 2 further includes a reacting chamber 23 which is used for mixing the sample with at least one reactant.

In this embodiment, as shown in FIG. 2, a second microchannel M2 is disposed between the first chamber 21 and the reacting chamber 23, preventing the sample flowing into the reacting chamber 23 from the first chamber 21. Moreover, a third microchannel M3 is disposed between the second chamber 22 and the reacting chamber 23, also preventing the mixed sample flowing into the second chamber 22 from the reacting chamber 23.

Figure 3:
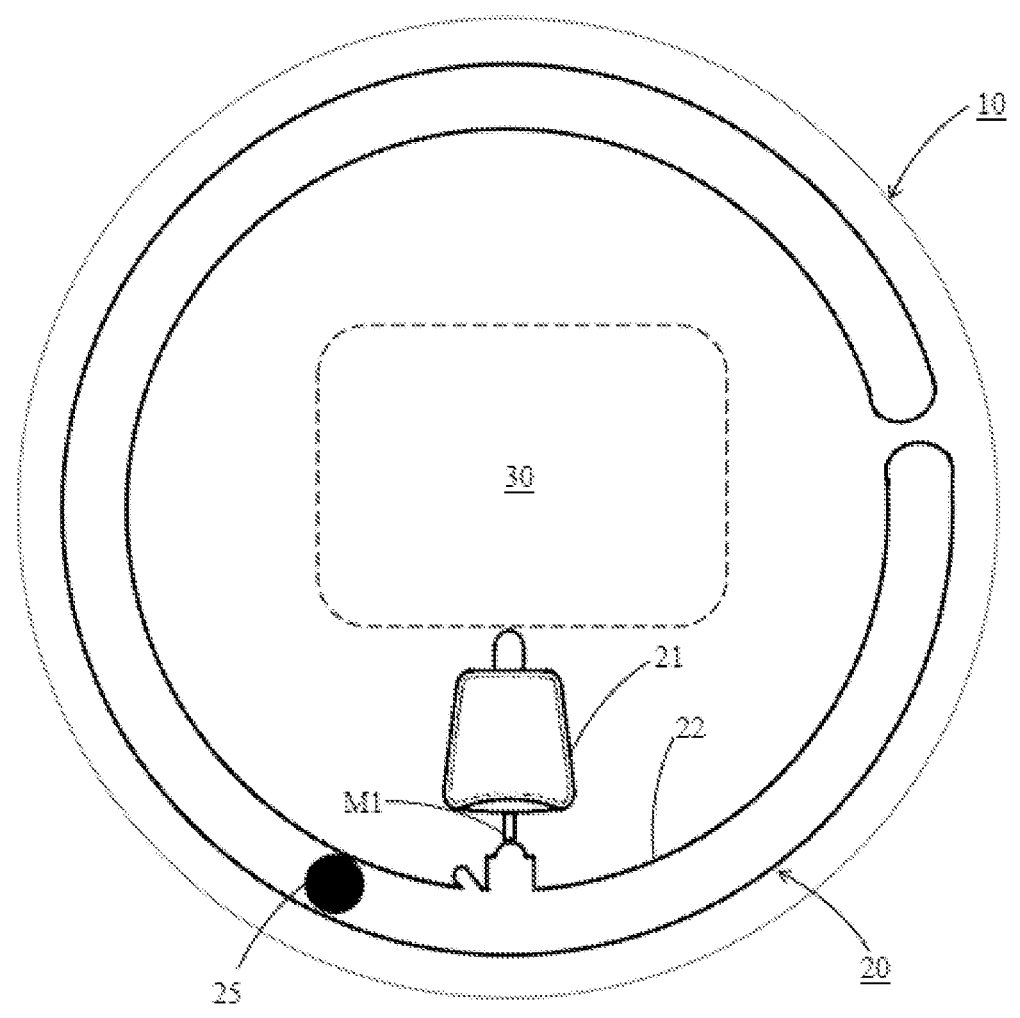
FIG. 3 is another schematic diagram depicting a viscometer in accordance with an embodiment of the present invention.

Please refer to FIG. 3. FIG. 3 is the other schematic diagram depicting a viscometer in accordance with one embodiment of the present invention. FIG. 3 is different from FIG. 1 and FIG. 2 that the second chamber 22 of the disk 10 is in shape of curved rather than of annular. In this embodiment, the second chamber 22 is in shape of curved. If the lowest horizontal point of the indicator 25 is outside the range of the second chamber 22, it is possible to adjust the incline direction of the disk 10 in the rotational status or the oscillatory status via the mechanical arm, the ball-type joint or combination thereof. Therefore, adjusting the lowest horizontal point within the range of the second chamber 22 makes the testing operation of the viscometer 1 run smoothly.

Figure 4:
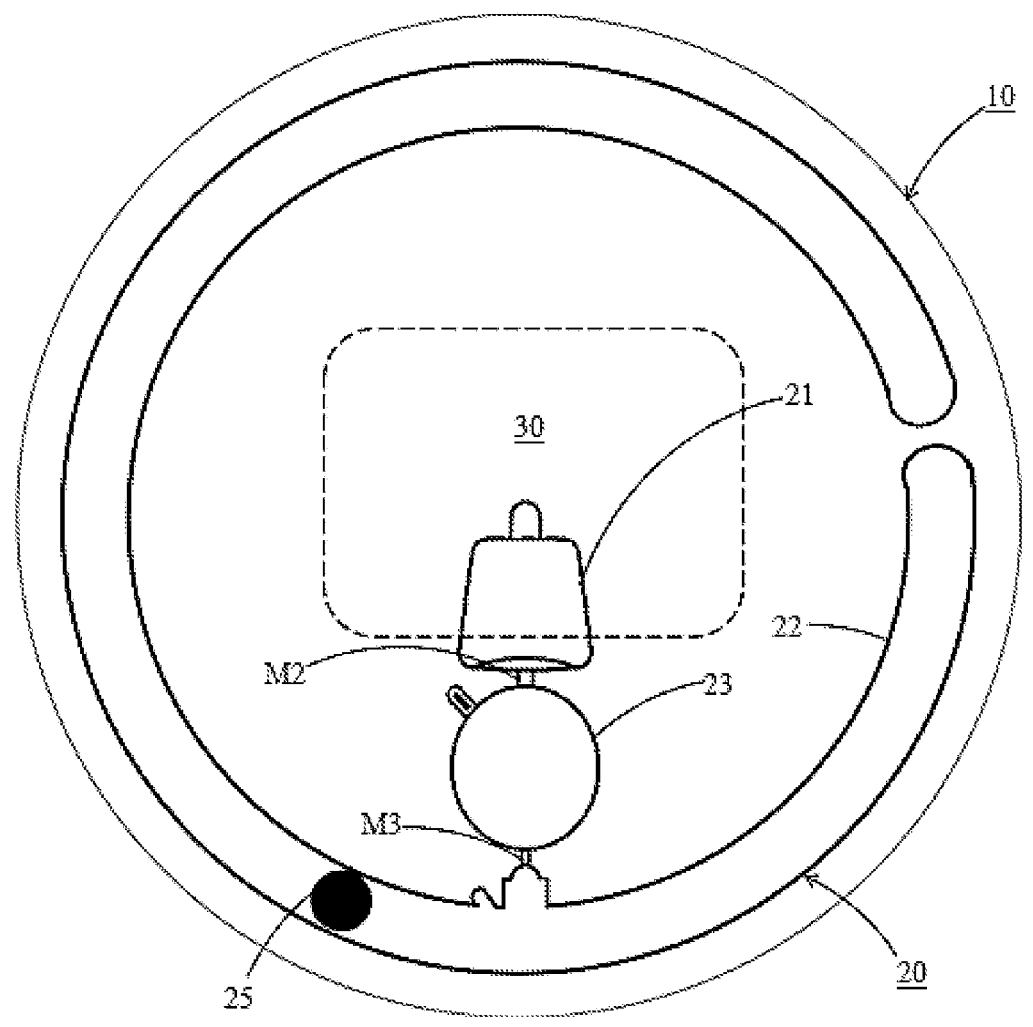
FIG. 4 is the other schematic diagram depicting a viscometer in accordance with an embodiment of the present invention.

Similarly, a difference between FIG. 3 and FIG. 4 is the viscometer 1 in FIG. 4 further includes a reacting chamber 23 which is used for mixing the sample with at least one reactant. As shown in FIG. 4, a second microchannel M2 is disposed between the first chamber 21 and the reacting chamber 23, preventing the sample from flowing into the reacting chamber 23 from the first chamber 21. Furthermore, a third microchannel M3 is disposed between the second chamber 22 and the reacting chamber 23, preventing the mixed sample from flowing into the second chamber 22 from the reacting chamber 23.

As embodiments in FIG. 3 and FIG. 4, said reactant, including but not limited to that the reactive agent in the liquid form or in the lyophilized form. The reactant may include one reactive agent or a combination of different reactive agents based on sample types or experimental requirements (e.g., it is possible to use various forms, such as liquid, solid-liquid or dry, of reactive agents to formulate the reactant at once).

Figure 5:
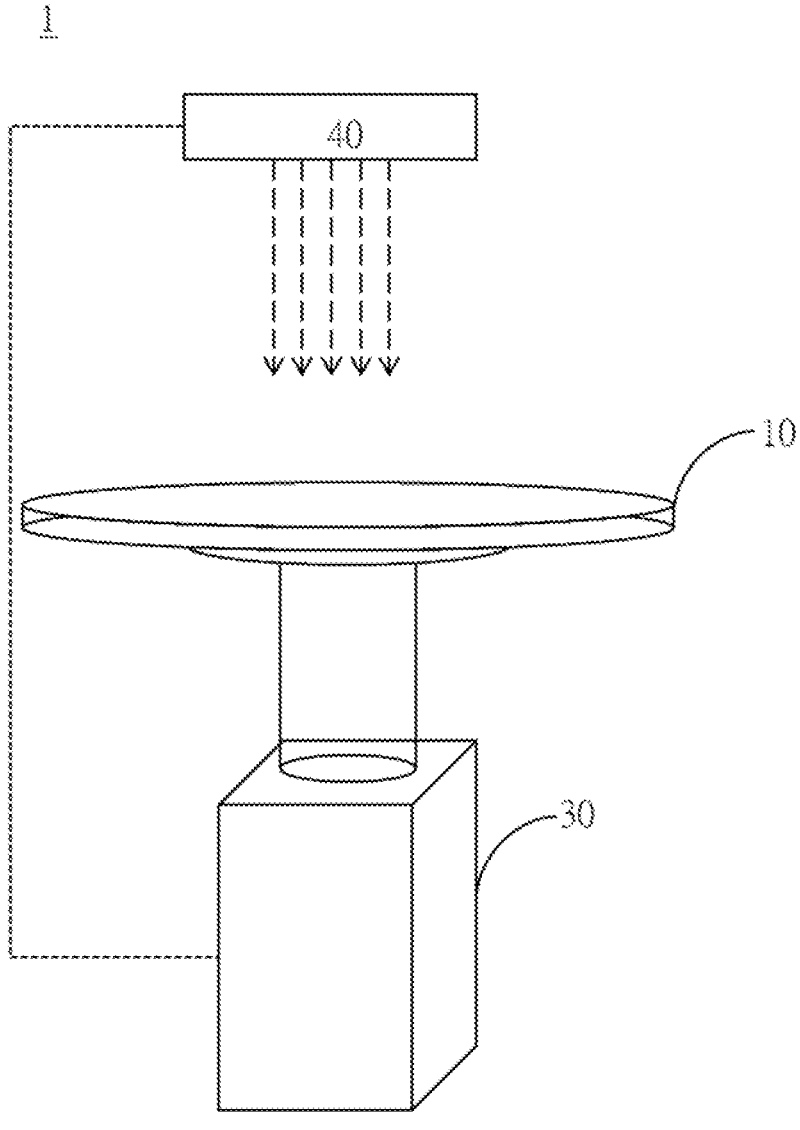
FIG. 5 is a schematic diagram depicting a monitoring device in accordance with an embodiment of the present invention.

Please see FIG. 5. FIG. 5 shows an actual configuration related to the viscometers shown in FIG. 1 to FIG. 4. As shown in FIG. 5, the monitoring device 40 is used to indicate one device which is away from and isolated the driver 30. If the disk 10 is able to be completely monitored, said monitoring device 40 can be arranged at any position inside or around the driver 30.

To realize the monitoring of the microfluidic structure 20, in some embodiments, the monitoring device 40 may be one electronic device with at least an image recording function (camera etc.). On the other hand, at least one processor may match with the monitoring device 40 such as a Micro Processor Unit (MPU), a Micro Controller Unit (MCU) or combinations thereof. The monitoring device 40 and the at least one processor perform generating/obtaining/recording images or video/film of the second chamber 22, and then extracting at least one moving path of the indicator 25 or calculating an oscillation amplitude of pendulum motion of the indicator 25 based on whole or partial moving paths. Finally, a viscosity value (cP) is calculated based on said oscillation amplitude of pendulum motion. In this case, the monitoring device 40 and the processor are configured to independently perform the above operations.

Figure 6:
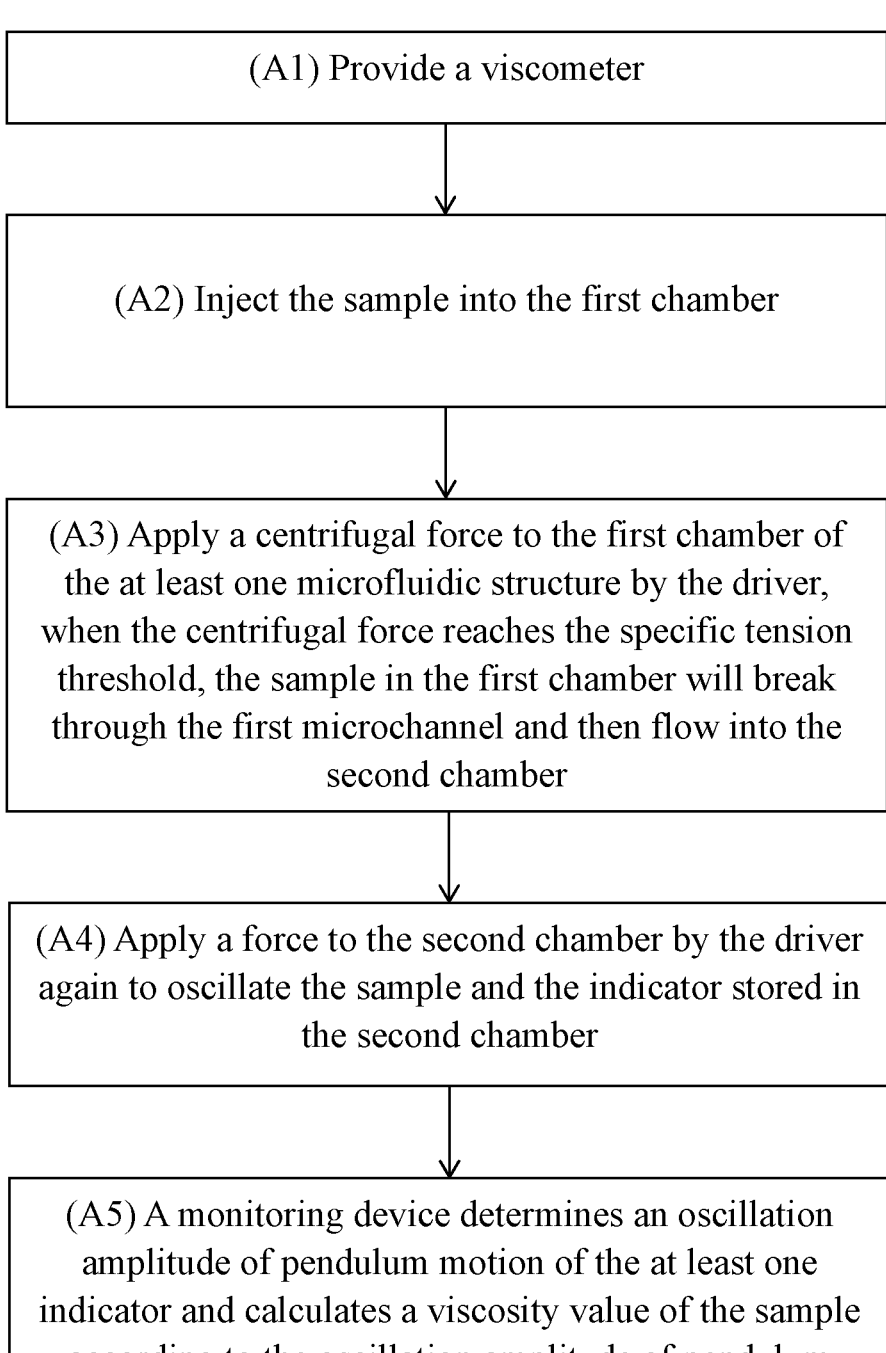
FIG. 6 is a flowchart illustrating an operating method of a viscometer in accordance with an embodiment of the present invention.

The operating method of a viscometer will be further explained in the following description. Referring to FIG. 6 and FIG. 7, FIG. 6 is a flowchart illustrating an operating method of a viscometer in accordance with an embodiment of the present invention. The operating method includes the following steps.

First, in step A1, a viscometer 1 as shown in FIG. 1 or FIG. 3 is provided. In step A2, the sample is injected into the first chamber 21 via the injection hole therein, for preparation. Thereafter, in step A3, the centrifugal force is applied to the first chamber 21 of the microfluidic structure 20 by the driver 30. At this moment, if the centrifugal force reaches the specific tension threshold, the sample originally stored in the first chamber 21 will break through the first microchannel M1 then flowing into said second chamber 22. In the step A4, a force is applied to the second chamber 22 of the microfluidic structure 20 by the driver 30 again to oscillate the sample and the indicator 25 which are stored in the second chamber 22. Finally, step A5 describes an observation process. That is, the oscillation amplitude of pendulum motion of the indicator 25 is determined according to an oscillation of the acquired images obtained by the monitoring device 40. At last, the viscosity value of the sample is calculated according to said oscillation amplitude of pendulum motion of the indicator 25.

With reference to FIG. 1, the second chamber 22 is an annular chamber which is along the circumferential direction of the disk 10. The second chamber 22 comprises at least one indicator 25. In this case, as the gravity, both of the indicator 25 and the sample naturally slide to a lowly side of the second chamber 22 when the driver 30 is turned off. At the same time, if the driver 30 oscillates the indicator 25 and the sample represents the pendulum motion in the second chamber 22 (As shown in step A4). Eventually, the monitoring device 40 is able to determine the oscillation amplitude of pendulum motion of the indicator 25, and the viscosity value (cP) of the sample is observed or calculated. Herein, the term "observe" can be used to indicate an observation process via human eyes or a mobile device. Moreover, the above method may be applied to the second chamber 22 in shape of curved which is shown in FIG. 3.

As described above, since the indicator 25 and the sample can naturally slide to a lowly side of the second chamber 22 under a non-ideal plane, different viscosity value of the sample over time may be acquired by recording and calculating dwell locations of the indicator 25. Herein, the term "dwell location" can be used to indicate the indicator 25 naturally slide to a lowly side and finally stay at the position of the second chamber 22 if the driver 30 is turned off.

For example, the sample may be assumed to be blood, and the reactant may be assumed to be coagulant, including, but not limited to glycoprotein 11b/11a, P2Y12 (purinergic receptor P2Y, G-protein coupled, 12) or Aspirin, thus. The sample may mix with the reactant in the reacting chamber 23, then flowing into the second chamber 22 (i.e. annular chamber). In this embodiment, the driver 30 is operated to start the oscillation of the indicator 25 from the above dwell location for forming the oscillation amplitude of pendulum motion which is relative to the dwell location. At this moment, the reaction between the sample and the reactant is not complete from the beginning. Thus, the oscillation amplitude of pendulum motion of the indicator 25 will initially reduce as the viscosity value (cP) of the sample is increased. However, the oscillation amplitude of the pendulum motion of the indicator 25 will subsequently increase by completely reacting between the sample and the reactant.

FIG. 7 is another flowchart illustrating an operating method of a viscometer in accordance with an embodiment of the present invention. First, in step B1, a viscometer 1 as shown in FIG. 2 or FIG. 4 is provided. In step B2, the sample is injected into the first chamber 21 via the injection hole for preparation. In step B3, the centrifugal force is applied to the first chamber 21 of the microfluidic structure 20 by the driver 30. At the same time, if the centrifugal force reaches the specific tension threshold, the sample in the first chamber 21 will break through the second microchannel M2 then flowing into the reacting chamber 23. In the step B4, after mixing the sample with the reactant to form a mixed sample in the reacting chamber 23, a force is applied to the reacting chamber 23 for leading the mixed sample break through the third microchannel M3 then flowing into the second chamber 22. Subsequently, in step B5, the force generated by driver 30 may apply to the second chamber 22, thereby leading the mixed sample and the indicator 25 in the second chamber 22 starts oscillating. Finally, step B6 describes an observation process. That is, the oscillation amplitude of pendulum motion of the indicator 25 is determined according to an oscillation of the acquired images obtained by the monitoring device 40. Therefore, the viscosity value (cP) of the sample is calculated according to said oscillation amplitude of pendulum motion of the indicator 25.

Further, in practical applications, the abovementioned monitoring device 40 may be configured to provide data except for the above oscillation. For example, the monitoring device 40 may cooperatively provide data relative to the operation state information of the indicator 25 with other remote sensors, such as radar detector, laser detector, LiDAR, magnetic detector or ultrasound detector, forming additional data which can be used for assisting calculation of the viscosity value of the sample to improve the accuracy of testing in an operation period. In this embodiment, the information as actually contribute to the viscosity value (cP) is an integrated data based on several types of data, not just the oscillation amplitude of pendulum motion.

The above description is merely the embodiments in the present invention; the claim is not limited to the description thereby. The equivalent structure or changing of the process of the content of the description and the figures, or to implement to other technical fields directly or indirectly should be included in the claim. All other embodiments obtained by a person of ordinary skill in the art based on the embodiments of the present invention without creative efforts shall fall within the protection scope of the present invention.

What is claimed is:

1. A viscometer comprising at least one microfluidic structure which is embedded in a disk, wherein the at least one microfluidic structure includes:

a first chamber, having an injection hole, a sample injected into the first chamber via the injection hole to temporarily store in the first chamber; and a second chamber, connecting to the first chamber via a first microchannel, and the second chamber having at least one indicator;

wherein at least one part of the second chamber is curved;

wherein the viscometer further comprises a monitoring device that is configured to receive and calculate a viscosity value of the sample according to an oscillation amplitude of pendulum motion of the at least one indicator.

2. The viscometer of claim 1, wherein cross-sectional shape of the second chamber is polygonal, round or combinations thereof.

3. The viscometer of claim 1, wherein the second chamber is an annular chamber.

4. The viscometer of claim 1, wherein the disk inclines toward at least one direction.

5. A viscometer comprising at least one microfluidic structure which is embedded in a disk, wherein the at least one microfluidic structure includes:

a first chamber, having an injection hole, a sample injected into the first chamber via the injection hole to temporarily store in the first chamber;

a reacting chamber, connecting to the first chamber, and the reacting chamber configured to mix the sample with at least one reactant stored therein; and a second chamber, connecting to the reacting chamber and having at least one indicator therein;

wherein a second microchannel is formed between the first chamber and the second chamber;

wherein a third micro channel is formed between the reacting chamber and the second chamber;

wherein at least one part of the second chamber is curved;

wherein the viscometer further comprises a monitoring device configured to receive and calculate a viscosity value of the sample according to an oscillation amplitude of pendulum motion of the at least one indicator.

6. The viscometer of claim 5, wherein cross-sectional shape of the second chamber is polygonal, round or combinations thereof.

7. The viscometer of claim 5, wherein the second chamber is an annular chamber.

8. The viscometer of claim 5, wherein the disk inclines toward at least one direction.

9. An operation method of a viscometer, comprising:

(A1) providing the viscometer of claim 1;

(A2) injecting the sample into the first chamber;

(A3) applying a centrifugal force to the first chamber of the at least one microfluidic structure by the driver, when the centrifugal force reaches the specific tension threshold, the sample in the first chamber will break through the first microchannel, then flowing into the second chamber;

(A4) applying a force to the second chamber by the driver again to oscillate the sample and the indicator stored in the second chamber; and (A5) a monitoring device determining an oscillation amplitude of pendulum motion of the at least one indicator, and calculating a viscosity value of the sample according to the oscillation amplitude of pendulum motion.

10. An operation method of a viscometer, comprising:

(B1) providing the viscometer of claim 5;

(B2) injecting the sample into the first chamber;

(B3) applying a centrifugal force to the first chamber of the at least one microfluidic structure by the driver, when the centrifugal force reaches the specific tension threshold, the sample in the first chamber will break through the second microchannel, then flowing into the reacting chamber;

(B4) after mixing the sample with the reactant to form a mixed sample in the reacting chamber, a force is applied to the reacting chamber for leading the mixed sample to break through the third microchannel, then flowing into the second chamber;

(B5) applying a force to the second chamber by the driver again to oscillate the sample and the indicator stored in the second chamber; and (B6) a monitoring device determining an oscillation amplitude of pendulum motion of the at least one indicator and calculating a viscosity value of the sample according to the oscillation amplitude of pendulum motion.

* * * * *